United States Patent

Amthor

[15] 3,664,878
[45] May 23, 1972

[54] PRESSURE RELIEF VENT VALVE FOR A FLUID TIGHT SEALED CONTAINER ESPECIALLY AN ALKALINE GALVANIC CELL

[72] Inventor: Helmut K. Amthor, Rocky River, Ohio
[73] Assignee: Union Carbide Corporation, New York, N.Y.
[22] Filed: Aug. 27, 1969
[21] Appl. No.: 853,279

[52] U.S. Cl. ............................................................136/178
[51] Int. Cl. ...........................................................H01m 1/06
[58] Field of Search..................136/178, 177, 179, 180, 169; 137/525; 220/44

[56] References Cited

UNITED STATES PATENTS

| | | | |
|---|---|---|---|
| 2,182,266 | 12/1939 | Schwartz | 136/178 |
| 2,306,982 | 12/1942 | Rolph | 136/178 |
| 2,321,089 | 6/1943 | Keller | 136/178 |
| 2,790,570 | 4/1957 | Hodges et al. | 136/178 X |
| 3,042,734 | 7/1962 | Carmichael et al. | 136/133 |
| 3,208,884 | 9/1965 | Jensen | 136/178 |
| 3,293,081 | 12/1966 | Daley | 136/178 |
| 3,337,900 | 8/1967 | Schwartzman | 137/525 X |
| 3,398,026 | 8/1968 | Andre | 136/178 |
| 3,415,690 | 12/1968 | Richman | 136/178 |

Primary Examiner—Anthony Skapars
Attorney—J. F. Hohmann and J. R. Doherty

[57] ABSTRACT

A pressure relief vent valve for a fluid-tight sealed container and especially a sealed alkaline galvanic cell, the pressure relief vent valve comprising a resilient deformable ball of an elastomeric material which is positioned to overlie a vent orifice provided within the container and a retainer means for maintaining the ball in place over the vent orifice and in contact with a valve seat provided around the peripheral edge portions of the vent orifice and for compressing and deforming the ball into a flattened configuration forming a normally fluid-tight seal between the ball and the valve seat.

19 Claims, 7 Drawing Figures

Patented May 23, 1972

INVENTOR
Helmut K. Amthor
BY
ATTORNEY

INVENTOR
Helmut K. Amthor
BY
ATTORNEY

PRESSURE RELIEF VENT VALVE FOR A FLUID TIGHT SEALED CONTAINER ESPECIALLY AN ALKALINE GALVANIC CELL

This invention relates to a pressure relief vent valve useful for relieving high internal gas pressures from inside a fluid-tight sealed container. More specifically, the invention relates to improvements in resealable pressure relief vent valves provided in sealed alkaline galvanic cells for preventing the build-up of high internal gas pressures inside the cell container.

Alkaline galvanic cells may generate large quantities of gas under certain conditions during use. Since these cells are required to be fluid-tightly sealed at all times in order to prevent loss of electrolyte by leakage or evaporation, high internal gas pressures may develop. Such pressures may cause leakage, bulging or possible explosion of the cell if not properly vented. Especially in the case of secondary or rechargeable cells, the vent must be resealable in order to avoid drying out of the electrolyte over the normally long life of the cells and to prevent ingress of oxygen and carbon dioxide.

In the past, several different types of resealable pressure relief vent valves have been used for releasing high internal gas pressures from inside a sealed alkaline galvanic cell. One type of valve that has been commonly used consists basically of a valve member such as a flat rubber gasket which is biased into sealing position over a vent orifice by means of a resilient member such as a helical spring. The resilient member or spring is set to yield at a certain predetermined internal gas pressure momentarily breaking the seal and allowing the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket such as an O-ring which is maintained in sealing position around the periphery of the vent orifice by means of an arc-shaped resilient member or spring. The resilient member or spring is set to yield and permit radial movement of the seal gasket momentarily breaking the seal and allowing the passage of gas through the vent orifice when a predetermined high internal gas pressure is reached inside the cell.

A major problem encountered with resealable pressure relief vent valves of the type just described is that they are bulky and consequently difficult to incorporate into the cell assembly. Furthermore, these pressure relief vent valves are expensive to manufacture and are not at all adaptable for incorporation into miniature size cells.

It is the primary object of this invention to provide a novel and improved pressure relief vent valve for use in relieving high internal gas pressures from inside a fluid-tight sealed container and especially an alkaline galvanic cell.

It is another object of this invention to provide a novel and improved pressure relief vent valve for an alkaline galvanic cell which automatically opens upon the build-up of a predetermined high internal gas pressure inside the cell and then reseal once the pressure has been relieved.

More specifically, another object of this invention is to provide a novel and improved resealable pressure relief vent valve for an alkaline galvanic cell which is simple and compact and employs a minimum number of parts, which is reliable and which can be so assembled as to be responsive to a given gas pressure over a wide range of pressures, which is inexpensive to manufacture and which can be easily adapted to incorporation within nearly all sizes of cells including miniature size cells.

Broadly, the above and other related objects of this invention are achieved by a novel and improved pressure relief vent valve for relieving high internal gas pressures from inside a fluid-tight sealed container and especially a sealed alkaline galvanic cell, the pressure relief vent valve comprising a resilient deformable ball of a suitable elastomeric material which is positioned to overlie a vent orifice provided within the container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build-up of a predetermined high internal gas pressure inside the container momentarily breaking the seal and allowing gas to escape through the vent orifice.

According to a preferred feature of the invention, an alkaline galvanic cell incorporates a so-called "two-mode" version of the pressure relief vent valve wherein the resilient deformable ball of elastomeric material is positioned within a deep vent orifice by forcing or pressing the ball through the opening of the vent orifice and exerts an initial high sealing force against the side walls of the vent orifice, sealing off the passageway through the vent orifice from inside the cell. The vent valve will remain closed with the resilient ball positioned within the vent orifice until the ball is expelled from the vent orifice by the build-up of an abnormally high internal gas pressure inside the cell. The resilient ball upon being expelled from the vent orifice allows some of the gas to escape from inside the cell but is thereafter caused to seat over the opening of the vent orifice by the retainer means in the same manner as previously described, i.e., the ball is retained in a flattened configuration overlying the vent orifice so as to form a normally fluid-tight seal between the ball and the valve seat.

The preferred "two-mode" version of the pressure relief vent valve of the invention is advantageous in that the valve can be set during manufacture of the cell to initially vent in its first mode of operation at a substantially higher pressure than the relatively low pressures at which the valve is operable in its second mode to vent and release gas pressure during normal use of the cell. During storage of the cell, the pressure relief vent valve will not open and vent until an abnormally high internal gas pressure is developed and thus the cell is protected against loss of moisture or water vapor which can result in drying out of the cell.

Figure 1:
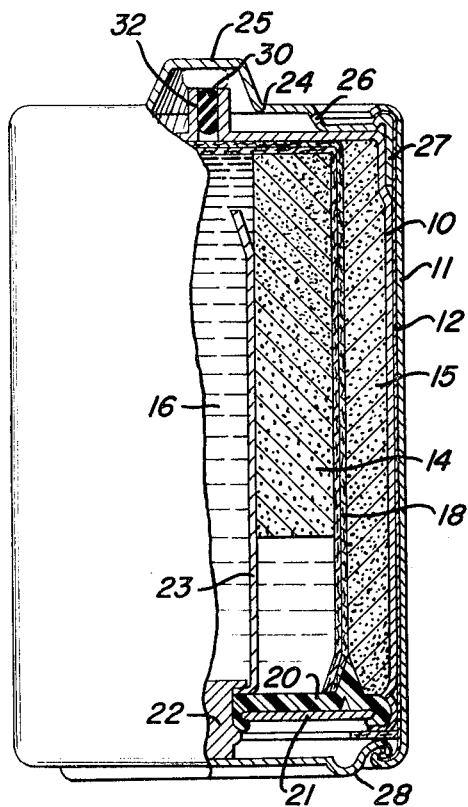
FIG. 1 is an elevational, partially sectioned view of a typical alkaline galvanic cell incorporating the pressure relief vent valve of the invention.
Figure 2:
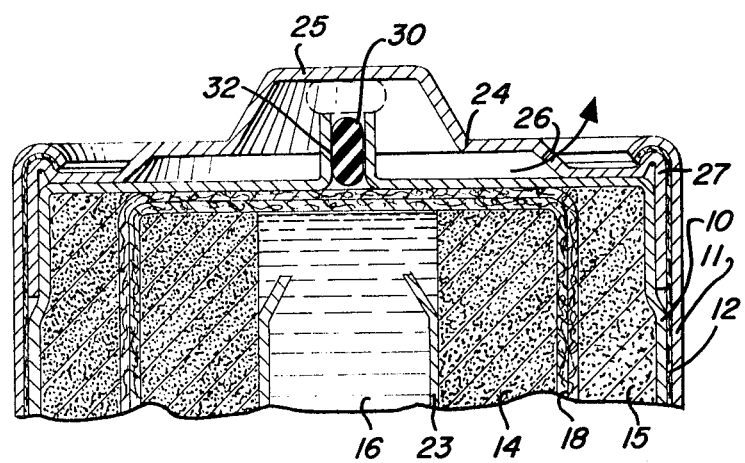
FIG. 2 is an enlarged sectional view of the upper portion of the cell shown in FIG. 1.

Referring now to the drawings in detail, there is shown in FIGS. 1 and 2 a typical alkaline galvanic cell incorporating a pressure relief vent valve in accordance with the invention. The cell comprises an inverted metallic cupped container 10 provided with an outer metallic jacket 11 separated from the container 10 by an insulating liner 12 suitably of paper or other fibrous material. Disposed within the container 10 is a tubular anode 14 and a tubular cathode 15 and an alkaline electrolyte 16 suitably an aqueous solution of potassium or sodium hydroxide. The cathode 15 is juxtaposed in contact with the side walls of the container 10 but is separated from the anode 14 by a liquid and gas permeable, electrolyte-containing separator medium 18. The separator medium 18 may be composed of two juxtaposed layers of separator material placed between the anode 14 and cathode 15 and underlying the upper closed end of the container 10.

Suitably, the cell closure for this cell is of the type disclosed and claimed in U.S. Pat. No. 3,042,734 issued to J. L. S. Daley on Feb. 15, 1960. Such a cell closure comprises a generally U-shaped annular seal gasket 20 for sealing the open end of the polarized cupped container 10, an unpolarized rigid metallic cover 21 which resides within the U-shaped annular seal gasket 20 and an oppositely polarized, centrally located terminal rivet 22 which is in contact with an anode current collector 23. The seal gasket 20 is preferably made of a relatively hard non-cold-flowable plastic material such as nylon and is radially compressed between the terminal rivet 22 and the metallic cover 21 and between the cover 21 and the lower peripheral edges of the container 10, thereby resulting in an extremely leak resistant fluid-tight sealed cell.

A metallic top cover plate 24 is provided for the cell and is formed with a central protuberance 25 serving as the positive terminal of the cell. The top cover plate 24 is provided with a vent hole 26 and is also formed with a peripheral ring portion 27 which is fitted tightly around the upper peripheral edges of the container 10 and is compressed or squeezed radially inwardly to provide a smooth juncture between the ring portion 27 and the side walls of the container 10. The metallic jacket 12 is locked in place around the upper and lower extremities of the cell by crimping its upper peripheral edges around the outer edges of the top cover plate 24 and by crimping its lower edges around the outer edges of a metallic bottom plate 28. The bottom plate 28 is maintained in electrical contact with the terminal rivet 22 and serves as the negative terminal of the cell.

The preferred "two-mode" version of the pressure relief vent valve used in the cell of FIGS. 1 and 2 includes a resilient ball 30 force-fitted or pressed into a smaller size circular vent orifice 32 formed within the upper closed end of the container 10. The resilient ball 30 is of an initial spherical shape but is compressed and deformed into an elongated or cylindrospherical configuration when force-fitted or pressed into the vent orifice 32. The vent orifice 32 is positioned to reside just beneath the central protuberance 25 provided on the top cover plate 24 and is formed with upwardly extending cylindrical side walls of a sufficient depth to provide a fairly deep hole to contain the elongated ball 30. It will be seen that the ball 30 is placed under resilient stress when force-fitted or pressed into the vent orifice 32 and exerts an initial high sealing force against the side walls of the vent orifice 32, sealing off the passageway through the vent orifice 32.

During the period that the cell is placed on storage, the pressure relief vent valve will remain sealed with the resilient elongated ball 30 positioned within the vent orifice 32 until the ball 30 is expelled from the vent orifice 32 by the build-up of an abnormally high internal gas pressure inside the cell. The top over plate 24 and the central protuberance 25 are so designed that the space or gap between the bottom wall portion of the protuberance 25 and the upper peripheral edges of the vent orifice 32 is less than the diameter of the resilient ball 30 in its initial spherical shape prior to being force-fitted or pressed into the vent orifice 32. Thus, it will be seen that the ball 30 when expelled from the vent orifice 32 immediately comes into contact with the flat bottom wall portion of the protuberance 25 which acts as a retainer means for the ball 30 and is compressed and deformed into a flattened configuration but in this instance the ball 30 is in a position overlying the vent orifice 32 as shown in phantom lines in FIGS. 1 and 2. The resilient ball 30 upon first being expelled from the vent orifice 32 is compressed and deformed to such an extent by the abnormally high internal gas pressure inside the cell that the ball 30 does not immediately seat with the peripheral edge portions of the vent orifice 32 providing an open passageway around the ball 30 for venting gas from inside the cell. The gas follows a path through the vent orifice 32 around the ball 30 and out through the vent hole 26 provided in the top cover plate 24.

Once the initial abnormally high internal gas pressure has been relieved, the resilient stress exerted by the flattened ball 30 forces the ball 30 into a normally fluid-tight seal engagement around the peripheral edge portions of the vent orifice 32 forming a valve seat. The vent valve will remain closed sealing off the vent orifice 32 until the internal gas pressure during use or discharge of the cell builds up to some predetermined value which is less than the abnormally high pressure at which the resilient ball 30 is expelled from the vent orifice 32. When this predetermined gas pressure is reached, the ball 30 will undergo further temporary deformation, momentarily breaking the seal around the peripheral edge portions of the vent orifice 32 and allowing gas to escape from inside the cell in the same manner as just described. The valve will remain open until the forces exerted against the ball 30 by the internal gas pressure are less than the sealing forces exerted by the resilient stress of the ball 30 whereupon the ball will again reseat against the peripheral edge portions of the vent orifice 32 and reseal the valve.

It will be readily seen that the preferred "two-mode" version of the pressure relief vent valve of the invention offers the advantage in that the cell can be maintained in hermetically sealed condition during the period of storage and thereby prolongs the storage life of the cell. It may be noted that during use or discharge of the cell, the internal gas pressure which can develop inside the cell usually builds up quite rapidly and it is most advantageous to vent the gas as soon as possible at fairly low venting pressures. During the period of storage, however, any internal gas pressure which may develop builds up at a slower rate and frequent gas venting at low pressures is not required. Venting at frequent intervals may in fact be detrimental since such venting may be accompanied by loss of moisture or water vapor which could result in drying out of the cell. With the preferred "two-mode" version of the pressure relief vent valve of the invention, the valve will not open to vent gas during the period of storage at the relatively low venting pressures for which the valve is operable to vent gas during discharge of the cell and will remain closed until an abnormally high internal gas pressure is reached which should be relieved in order to prevent the possibility of cell explosion.

Figure 3:
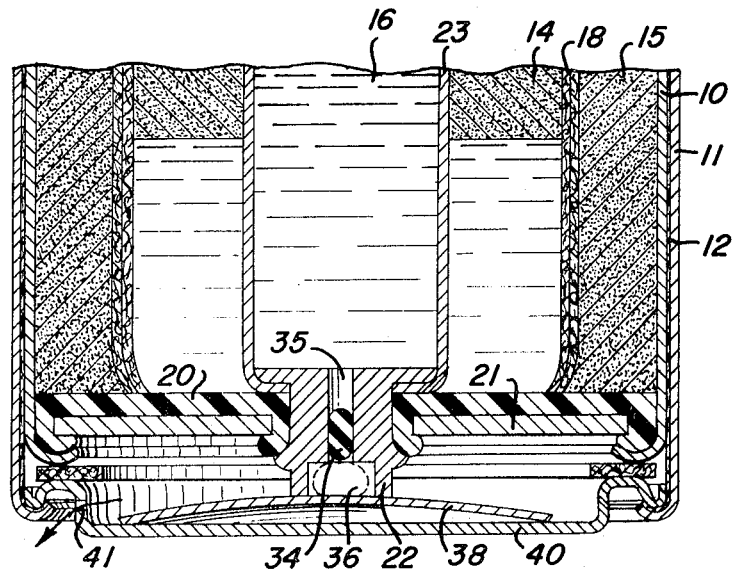
FIG. 3 is an enlarged sectional view of the lower bottom portion of the cell shown in FIG. 1 and illustrates a different embodiment of the invention.

FIG. 3 shows a different embodiment of the invention wherein the "two-mode" version of the pressure relief vent valve is incorporated within the cell closure at the bottom of the cell. The resilient ball 34 is force-fitted or pressed into a fairly deep circular vent orifice 35 provided within the terminal rivet 22. The rivet head portion of the terminal rivet 22 is formed with an enlarged circular recess 36 for receiving the resilient ball 34 when it is expelled from within the vent orifice 35. A disc-shaped spring member 38 is positioned in contact against the rivet head and overlies the circular recess 36 being biased into resilient contact at its outer peripheral edges against a metallic bottom cover plate 40 provided with a vent hole 41. The depth of the circular recess 36 is such that the resilient ball 34 when expelled from the vent orifice 35 is maintained by the spring member 38 in a flattened configuration overlying the vent orifice 35 as shown in phantom lines in FIG. 3 and forming a normally fluid-tight seal around the peripheral edge portions of the vent orifice 35. The spring member 38 in this embodiment acts both as a retainer means for the resilient flattened ball 34 upon being expelled from the vent orifice 35 and as a means for maintaining electrical contact between the terminal rivet 22 and the metallic bottom cover plate 40 serving as the negative terminal of the cell.

Figure 4:
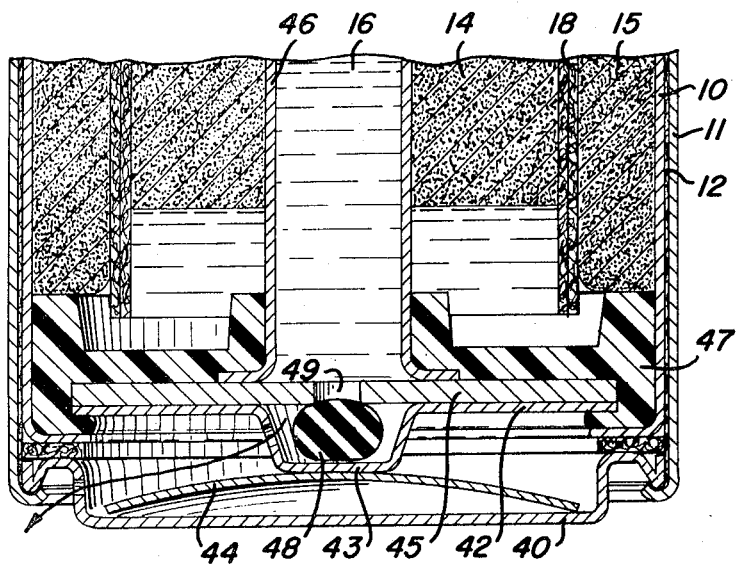
FIG. 4 is a similar view illustrating another embodiment of the invention.

In the embodiment of the invention illustrated in FIG. 4, the pressure relief vent valve is incorporated within a modified cell closure which is similar to that used in the cell previously described, except that electrical connection with the metallic bottom cover plate 40 is achieved by means of a polarized metallic cap 42. The metallic cap 42 is provided with a central protuberance 43 which makes contact with a disc-shaped spring member 44, the outer peripheral edges of which are biased into resilient contact with the metallic bottom cover plate 40. The cap 42 underlies the polarized rigid metallic cover 45 which is in contact with the anode current collector 46. The metallic cover 45 together with the cap 42 reside within a generally U-shaped annular seal gasket 47 which is radially compressed between the metallic cover 45 and the lower peripheral edges of the container 10.

The pressure relief vent valve used in this embodiment of the invention includes a resilient ball 48 positioned within the central protuberance 43 on the metallic cap 42 and overlies a shallow vent orifice 49 provided within the metallic cover 45. The protuberance 43 serves as a retainer means for maintaining the resilient ball 48 in place over the vent orifice 49 and for compressing and deforming the ball 48 into a flattened configuration forming a normally fluid-tight seal around the peripheral edge portions of the vent orifice 49. It should be noted that in this embodiment of the invention the pressure relief vent valve is operable to vent gas from inside the cell at relatively low venting pressures and does not incorporate the so-called "two mode" version of the valve as illustrated in FIGS. 1–3.

Figure 5:
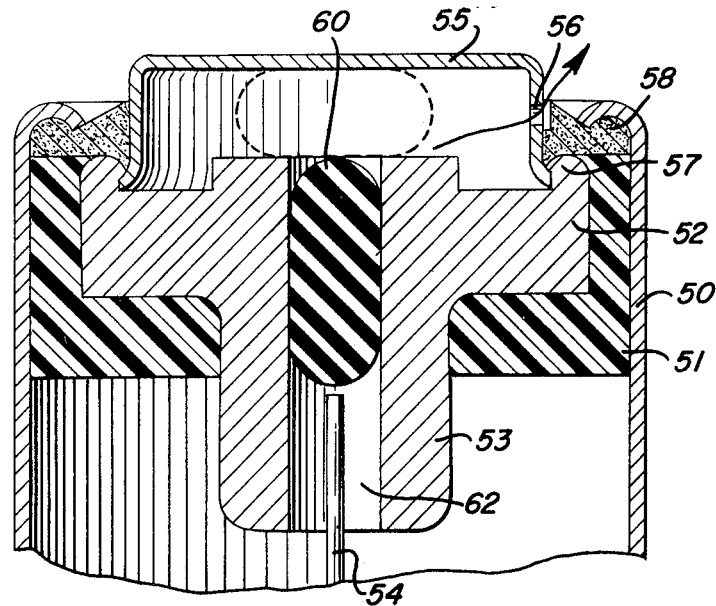
FIG. 5 is a sectional view of the upper portion of a miniature size cell illustrating still another embodiment of the invention.

FIG. 5 illustrates another embodiment of the invention which is useful for incorporating the pressure relief vent valve into a miniature size cell. The cell comprises a metallic container 50 having its upper open end sealed by a generally L-shaped annular seal gasket 51 suitably of a relatively hard insulating plastic material. A polarized metallic cover 52 resides within the L-shaped annular seal gasket 51 and is formed with a downwardly depending central stem portion 53 which fits through the opening in the seal gasket 51. An electrical conductor member 54 such as a metallic pin is welded or otherwise secured to the central stem portion 53 and makes electrical connection with one of the electrodes of the cell. A metallic terminal cap 55 provided with a vent hole 56 is positioned over the metallic cover 52 and has its lower peripheral edges locked in place by a peripheral bead or flange 57 formed around the outer peripheral edges of the metallic cover 52. The seal gasket 51 is radially compressed between the metallic cover 52 and the container 10 and the upper peripheral edges of the container 10 are crimped over a seal ring 58 suitably of a relatively soft resilient plastic material.

The "two-mode" version of the pressure relief vent valve of this embodiment includes a resilient ball 60 which is force-fitted or pressed into a deep vent orifice 62 provided within the central stem portion 53. As in the case of the previously described embodiments of the vent valve, the resilient ball 60 is compressed and deformed into an elongated or cylindrospherical configuration when force-fitted or pressed into the vent orifice 62 forming a high pressure seal. The space or gap between the metallic terminal cap 55 and the peripheral edge portions of the vent orifice 62 is such that the ball 60 is maintained in a flattened configuration as shown in phantom lines in FIG. 5 when the ball is expelled from within the vent orifice 62.

Figure 6:
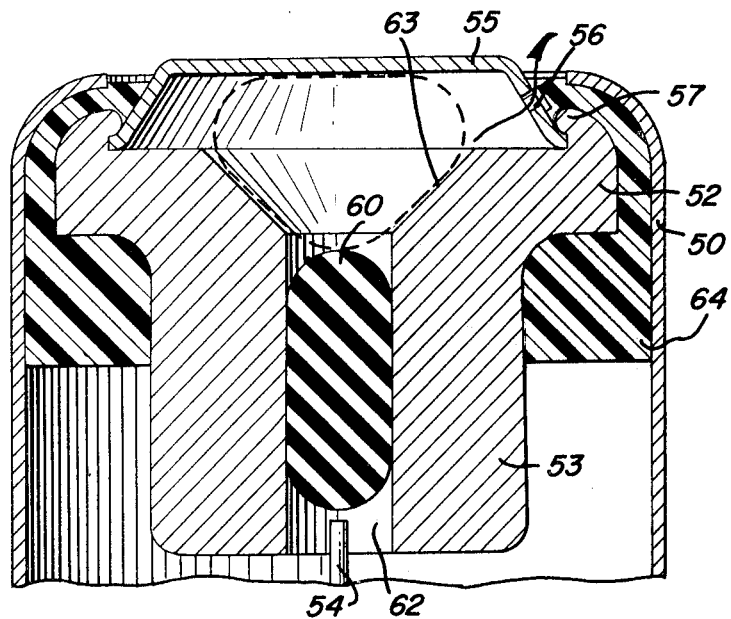
FIG. 6 is a sectional view of the upper portion of a similar cell illustrating still another embodiment of the invention.

The embodiment of the invention illustrated in FIG. 6 is basically the same as that just described, except that the vent orifice 62 is formed with a conical shaped valve seat around its peripheral edge portions as indicated at 63. Thus, the resilient ball 60 when expelled from the vent orifice 62 is retained by the metallic terminal cap 55 in a flattened conical configuration against the conical surfaces 63 around the opening of the vent orifice 62 forming the valve seat. It will be seen that in this embodiment of the invention, the resilient ball 60 is compressed to a degree which is somewhat less than when the ball is deformed to a flattened configuration as in the previous embodiments described and that, therefore, the vent valve is capable of venting gas at substantially lower internal gas pressures from inside the cell. It will also be noted in this embodiment that the cell is of the same basic construction as that illustrated in FIG. 5 except that the upper peripheral edges of the container 10 are crimped over the upper edges of an L-shaped annular seal gasket 64.

Figure 7:
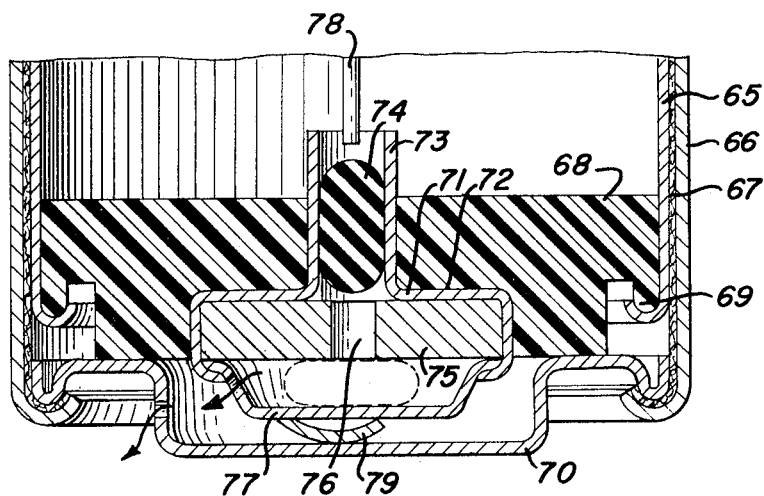
FIG. 7 is a sectional view of the lower portion of a cell similar to that shown in FIG. 1 and illustrating a further embodiment of the invention.

FIG. 7 illustrates still another embodiment of the invention incorporating the "two-mode" version of the pressure relief vent valve which can be used in the same type of cell construction as that illustrated in FIGS. 3 and 4. The cell includes an inverted polarized metallic cup container 65 provided with an outer metallic jacket 66 separated from the container 65 by an insulating liner 67 suitably of paper or other fibrous material. The open end of the container 65 is sealed by a rigid annular insulating cover 68 suitably of a relatively hard plastic material. The peripheral edge portion of the annular insulating cover 68 abuts against the side walls of the container 65 which are radially compressed inwardly to provide a fluid-tight seal juncture between the cover 68 and the container 65. The lower peripheral edges of the container 65 are crimped over a peripheral bead or flange 69 formed integrally around the outer edges of the insulating cover 68. The metallic jacket 66 and the insulating liner 67 extend beyond the lower extremities of the container 65 and are similarly crimped over the outer edges of a metallic bottom cover plate 70 which serves as the negative terminal of the cell.

The pressure relief vent valve used in this embodiment of the invention includes an inverted metallic cup 71 which resides within a shallow circular recess 72 formed within the annular insulating cover 68. The cup 71 is provided with a central upwardly extending cylindrical stem or sleeve portion 73 which is fluid-tightly fitted through the opening in the insulating cover 68 and provides a fairly deep elongated vent orifice for the valve. A resilient ball 74 is force-fitted or pressed into the elongated stem or sleeve portion 73 and is compressed and deformed into an elongated configuration as shown, sealing off the vent orifice under a high sealing pressure in the same manner as previously described. Positioned inside the metallic cup 71 is a vent washer 75 having its opening 76 located in alignment with the opening of the central stem or sleeve portion 73. In this embodiment of the invention, the opening 76 in the vent washer 75 may be used as a means for increasing the initial first mode venting pressure at which the resilient ball 74 will be expelled from the vent orifice. Thus, the opening 76 in the vent washer 75 may be made of a size slightly smaller in diameter than the internal diameter of the central stem or sleeve portion 73 so as to restrict the outward movement of the resilient ball 74 upon the build-up of an abnormally high internal gas pressure inside the cell.

Once the resilient ball 74 has been expelled from within the vent orifice and through the opening 76 in the vent washer 75, the ball 74 is maintained in position overlying the opening 76 and is compressed and deformed into a flattened configuration as shown in phantom lines in FIG. 7 by means of a metallic cap 77. The cap 77 is held tightly in place by the lower peripheral edges of the inverted metallic cup 71 which are crimped over the outer edges of the cap 77. A conductor member 78 is secured as by welding to the stem or sleeve portion 73 of the metallic cup 71 and makes electrical connection with one electrode of the cell. A resilient spring member 79 which may be punched out from the cap 77 is positioned in contact with the metallic bottom cover plate 70 which serves as the negative terminal of the cell.

An important feature of the pressure relief vent valve of the invention is that the valve is resealable once the internal gas pressure which develops inside the cell has been relieved. Thus, it will be seen that in all of the embodiments of the vent valve described the resilient flattened ball of elastomeric material possesses an inherent resilient stress which acts as a biasing force to restore the ball back into its sealing position against the peripheral edge portions of the vent orifice when the ball is caused to undergo further temporary deformation upon the build-up of a predetermined internal gas pressure inside the cell. It should be noted, however, that in the case of miniature size cells such as AAA cells, the primary function of the valve is to act as a positive "fail-safe" pressure relief vent and once the ball has been expelled from the vent orifice, the valve must not plug up and fail to vent. In order to insure that the vent valve will operate safely in these miniature size cells, it may be desirable to assemble the vent valve in such a way that the resilient ball is under a fairly low final compression and, therefore, will vent at relatively low venting pressures. In such instances, the resilient ball may be prevented from seating properly with the vent orifice to achieve resealability due to the presence of particles of active material which may be carried up onto the valve seat from inside the cell. The failure of the valve to seal or reseat properly is not viewed as a fault of the valve but rather as simply a result of the environment.

In the broadest aspect of the invention, the resilient ball used in the pressure relief vent valve may be made from most any resilient elastomeric material. Preferably, however, in the case of an alkaline galvanic cell, the resilient ball should be made from a resilient elastomeric material which is chemically resistant to the alkaline electrolyte of the cell. A suitable chemically resistant elastomeric material for the resilient ball is an ethylene-propylene copolymer. The hardness of the resilient ball preferably is in the range of from about 60 to 70 Durometer and the ball should be capable of maintaining its resiliency over a long period of time under a substantial amount of deformation; for example, in the first mode of operation of the valve, the diameter of the elongated or cylindro-spherical ball force-fitted or pressed into the vent orifice should be about 50 to 70 percent of the diameter of the ball in its initial spherical shape.

As already indicated, the peripheral edge portions surrounding the opening of the vent orifice may be used to form the valve seat for the resilient ball in the pressure relief vent valve of the invention. It should be understood, however, that the valve seat for the resilient ball may be formed by a separate member overlying the opening of the vent orifice as in the case of the vent washer used in the embodiment illustrated in FIG. 7. Generally speaking, the valve seat in all the embodiments except that illustrated in FIG. 6, should be roughly 90 degrees in cross-section forming a square shoulder with a sharp edge for minimal contact with the resilient ball to insure a fluid-tight seal.

It should be noted that the resilient ball used in the pressure relief vent valve is of an initial spherical shape and that the valve seat against which the ball bears is circular in the case where the valve is used only as a low pressure vent as illustrated in FIG. 4 or in the case of the "two-mode" version of the valve. However, when the valve is used only in the first mode of operation as a positive "fail safe" pressure vent as described above in connection with miniature size cells, the resilient ball may be of other configurations such as cylindrical or spheroid, for example, although a spherical ball is preferred.

In some cases, it may be desirable to use a surface additive for lubricating the resilient ball in order to facilitate pressing the ball into the vent orifice and to insure that the ball is properly expelled from the vent orifice in the "two-mode" version of the valve. The lubricant also serves to seal minor imperfections in the valve seat or surfaces of the ball and prevents salt encrustment from any liquid electrolyte which may come into contact with the vent valve. Suitable surface additives and lubricants include silicone grease, soap and waxes, for example.

As an illustration of the practice of the invention, a number of alkaline zinc-manganese dioxide cells of various sizes, e.g., D, AA, AAA cells, have been made using the pressure relief vent valve of the invention. The resilient deformable ball used in the valves was of spherical shape and was made from an ethylene-propylene copolymer. The diameter of the balls ranged from about three thirty-seconds to three-sixteenths inch depending on the size of the cell. The venting pressure level of the vent valves used in these cells was set by suitable choice of parameters, i.e., resiliency of the ball, the difference in relative sizes between the ball and the vent orifice, etc., over a wide range of sealing pressures from about 5 to 500 psi. The pressure relief vent valves were found to perform satisfactorily in that gas venting occurred in a predictable and reproducible manner for the various venting pressures used.

It will be seen then that the present invention provides a novel and improved pressure relief vent valve for relieving high internal gas pressures from inside a fluid-tight sealed container and especially a sealed alkaline galvanic cell. The pressure relief vent valve of the invention is particularly advantageous in that it is simple and compact and readily adaptable to use in miniature size cells, employs a minimum number of parts with the resilient ball being the only moving part, can be assembled as a unit with little or no handling and employs no parts having critical tolerances in its assembly. The vent valve is furthermore resealable once the internal gas pressure has been relieved from the inside of the container and is responsive over a wide range of gas pressures and is relatively inexpensive to manufacture.

What is claimed is:

1. In a galvanic cell including a fluid-tight sealed container; a pressure relief vent valve for releasing gas from inside said container, said valve comprising, in combination, a resilient deformable ball of an elastomeric material positioned to overlie a vent orifice provided in a portion of said container and to contact a valve seat provided around the peripheral edge portions of said vent orifice, said ball being of an initial spherical shape and of a size larger than that of said vent orifice, and a retainer means positioned over and spaced from said valve seat such that the gap between said retainer means and said valve seat is smaller than the size of said resilient ball whereby said ball is maintained in a state of compression between said retainer means and said valve seat and is distorted into a flattened configuration, said flattened ball exerting a resilient sealing force against said valve seat forming a normally fluid-tight seal between said ball and said valve seat, said flattened ball being capable of undergoing further temporary deformation upon the build-up of a predetermined high internal gas pressure inside said container momentarily breaking the seal and allowing gas to escape through said vent orifice.

2. The galvanic cell in accordance with claim 1 wherein the resilient deformable ball is made of an elastomeric material possessing a hardness of from about 60 to 70 Durometer.

3. The galvanic cell in accordance with claim 1 wherein the valve seat is formed with a substantially square shoulder providing a sharp peripheral edge for minimal contact with said resilient ball.

4. The galvanic cell in accordance with claim 1 wherein the surfaces of the valve seat are of a substantially conical configuration.

5. The galvanic cell in accordance with claim 1 wherein the valve seat is formed by the inner peripheral edge portions of said vent orifice.

6. The galvanic cell in accordance with claim 1 wherein one end of said container is sealed by a closure comprising a rigid metallic cover which fits in said end of said container and a seal gasket fluid-tightly sealed between said metallic cover and said container, and wherein the vent orifice is provided within said metallic cover.

7. The galvanic cell in accordance with claim 6 wherein the retainer means is a metallic cap having a protuberance which fits over said resilient ball in pressure contact therewith and further including a spring member in electrical contact between said protuberance and a metallic bottom cover plate locked in engagement around the extremities of said cell.

8. In a galvanic cell including a fluid-tight sealed container; a pressure relief vent valve for releasing gas from inside said container, said valve comprising a resilient deformable ball of an elastomeric material force-fitted into a smaller size vent orifice provided within a portion of said container, said ball being compressed and deformed into a substantially elongated configuration within said vent orifice such that the resilient stress of said ball exerts a high sealing force against the side walls of said orifice, said ball being expelled from said vent orifice upon the build-up of an abnormally high internal gas pressure inside said cell.

9. The galvanic cell in accordance with claim 8 further including a valve seat provided around the peripheral edge portions of said vent orifice and a retainer means positioned over and spaced from said valve seat such that the gap between said retainer means and said valve seat is smaller than the size of the resilient ball in its initial shape prior to being force-fitted into said vent orifice, said ball upon expulsion from said vent orifice being compressed and deformed by said retainer means into a substantially flattened configuration overlying said vent orifice and in contact with said valve seat forming a fluid-tight seal between said ball and said valve seat.

10. The galvanic cell in accordance with claim 9 wherein the vent orifice is provided within the closed end wall of said container and wherein the retainer means comprises a metallic cover plate having a central protuberance positioned over said closed end wall of said container and spaced from said valve seat, the gap between said valve seat and said central protuberance being smaller than the size of said resilient ball in its initial shape prior to being force-fitted into said vent orifice.

11. The galvanic cell in accordance with claim 9 wherein one end of said container is sealed by a closure comprising a rigid metallic cover which fits in said end of said container and an annular seal gasket fluid-tightly sealed between said metallic cover and said container, said metallic cover being formed with a centrally located depending stem portion which fits through the opening in said seal gasket, and wherein the vent orifice is provided through said centrally located depending stem portion of said metallic cover.

12. The galvanic cell in accordance with claim 11 wherein the retainer means comprises a metallic terminal cap positioned over and secured to said metallic cover, said terminal cap being spaced from the valve seat formed around the peripheral edge portions of said vent orifice such that the gap between said terminal cap and said valve seat is smaller than the size of the resilient ball in its initial shape prior to being force-fitted into said vent orifice.

13. The galvanic cell in accordance with claim 12 wherein the surfaces of the valve seat are of a substantially conical configuration.

14. The galvanic cell in accordance with claim 9 wherein one end of said container is sealed by a closure comprising a generally U-shaped annular seal gasket which fits in said end of said container, a rigid metallic cover positioned within said U-shaped seal gasket and a terminal rivet fitted through the central opening of said seal gasket, said seal gasket being fluid-tightly sealed between said metallic cover and said rivet and between said metallic cover and said container, and wherein the vent orifice is provided through said terminal rivet.

15. The galvanic cell in accordance with claim 14 wherein the rivet head portion of said terminal rivet is formed with a circular recess communicating with said vent orifice, the depth of said circular recess being smaller than the size of the resilient ball in its initial shape prior to being force-fitted into said vent orifice, and wherein said retainer means comprises a resilient spring member overlying said circular recess and making electrical contact with a metallic cover plate locked in engagement around the outer extremities of the cell.

16. The galvanic cell in accordance with claim 9 wherein one end of the container is sealed by a closure comprising a rigid insulating annular cover which fits in said end of said container, the outer peripheral edges of said insulating annular cover abutting with the peripheral edges of said container forming a fluid-tight seal, said insulating annular cover having a shallow recess formed therein to accommodate a metallic cup having a centrally located depending stem portion fitting through the opening in said insulating annular cover, said depending stem portion forming the vent orifice and wherein a vent washer is positioned within said metallic cup having its opening in alignment with the opening of the depending stem portion and forming the valve seat.

17. The galvanic cell in accordance with claim 16 wherein the retainer means comprises a metallic cap positioned over said resilient ball in pressure contact therewith, said cap being spaced from the valve seat formed by the opening in said vent washer such the gap between said metallic cup and said valve seat is smaller than the size of the resilient ball in its initial shape prior to being force-fitted into said vent orifice.

18. The galvanic cell in accordance with claim 17 wherein a resilient spring member is positioned in contact between said metallic cap and a metallic closure plate locked in engagement around the outer extremities of said cell.

19. The galvanic cell in accordance with claim 17 wherein the opening in said vent washer is of a smaller size than the vent orifice formed by the centrally located depending stem portion of said metallic cup.

* * * * *

UNITED STATES PATENT OFFICE
CERTIFICATE OF CORRECTION

Patent No. 3,664,878                    Dated  May 23, 1972

Inventor(s)  H. K. Amthor

It is certified that error appears in the above-identified patent and that said Letters Patent are hereby corrected as shown below:

Column 3, lines 2 and 3 (Page 6, lines 17 and 18 of Application No. 853,279:

"J.L.S. Daley on February 15, 1960" should read
-- R. Carmichael et al. on July 3, 1962 --

Column 3, line 23 (page 7, line 5 of Application No. 853,279):

the numeral "12" should read -- 11 --

Column 5, lines 36, 37 and 69 (page 11, lines 30 and 31, and page 12, line 30 of Application No. 853,279):

the numeral "10" should read -- 50 --

Signed and Sealed this twenty-eight Day of October 1975

[SEAL]

Attest:

RUTH C. MASON
*Attesting Officer*

C. MARSHALL DANN
*Commissioner of Patents and Trademarks*